(12) United States Patent
Peplinski et al.

(10) Patent No.: US 10,363,691 B2
(45) Date of Patent: Jul. 30, 2019

(54) METALLIC RESIN MOLDING OF ANNULAR COMPONENTS WITHOUT VISIBLE KNIT LINE

(71) Applicants: Eric R Peplinski, Shelby Township, MI (US); Jean-Philippe R Loew, White Lake Township, MI (US)

(72) Inventors: Eric R Peplinski, Shelby Township, MI (US); Jean-Philippe R Loew, White Lake Township, MI (US)

(73) Assignee: FCA US LLC, Auburn Hills, MI (US)

( * ) Notice: Subject to any disclaimer, the term of this patent is extended or adjusted under 35 U.S.C. 154(b) by 219 days.

(21) Appl. No.: 15/257,314

(22) Filed: Sep. 6, 2016

(65) Prior Publication Data
US 2018/0065283 A1 Mar. 8, 2018

(51) Int. Cl.
| | |
|---|---|
| *B29C 45/00* | (2006.01) |
| *B29C 45/73* | (2006.01) |
| *B29L 31/00* | (2006.01) |
| *B29K 105/18* | (2006.01) |

(52) U.S. Cl.
CPC ...... *B29C 45/0046* (2013.01); *B29C 45/0013* (2013.01); *B29C 45/0025* (2013.01); *B29C 45/73* (2013.01); *B29C 2045/0044* (2013.01); *B29C 2045/7343* (2013.01); *B29K 2105/18* (2013.01); *B29L 2031/7096* (2013.01)

(58) Field of Classification Search
CPC .................................................. B29C 45/0046
USPC ......................................................... 264/108
See application file for complete search history.

(56) References Cited

U.S. PATENT DOCUMENTS

| | | | |
|---|---|---|---|
| 4,008,031 A | 2/1977 | Weber | |
| 6,224,813 B1 * | 5/2001 | Chang | B29C 45/73 |
| | | | 264/328.12 |
| 2005/0084697 A1 * | 4/2005 | Smillie | B32B 27/08 |
| | | | 428/518 |
| 2015/0158215 A1 * | 6/2015 | Kikuchi | B29C 45/0025 |
| | | | 264/108 |

OTHER PUBLICATIONS

Weld Lines; Weld Line Occurrence in Plastic Injection Molded Parts; Downloaded from: http://steinwall.com/wp-content/uploads/2016/05/Weld-Lines.pdf on Aug. 1, 2016.

* cited by examiner

*Primary Examiner* — Tabatha L Penny
(74) *Attorney, Agent, or Firm* — Ralph E. Smith

(57) ABSTRACT

A core mold component defining a lower surface of the injection mold set corresponding to the lower surface of the annular component is heated to a base temperature. A cavity mold component defining the upper surface of the injection mold set corresponding to the Class A surface of the annular component is heated to a higher temperature than the base temperature. Faces of two streams of metallic resin, including the metallic resin flakes, injected into the mold set are caused to come together at the knit line. Metallic resin flakes are caused to flow into inboard and outboard overflow cavity through respective inboard and outboard gates positioned adjacent the knit line.

4 Claims, 4 Drawing Sheets

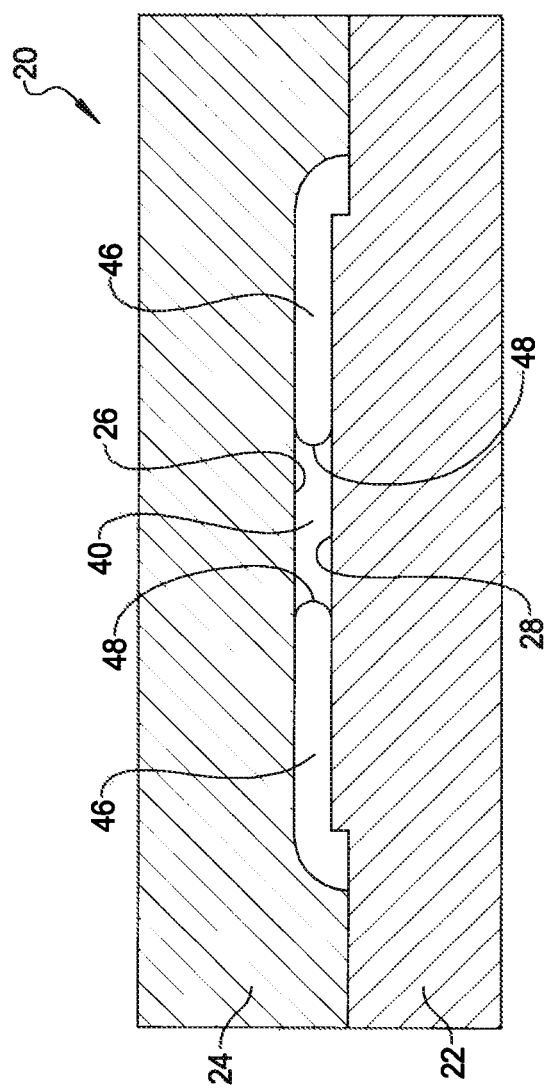

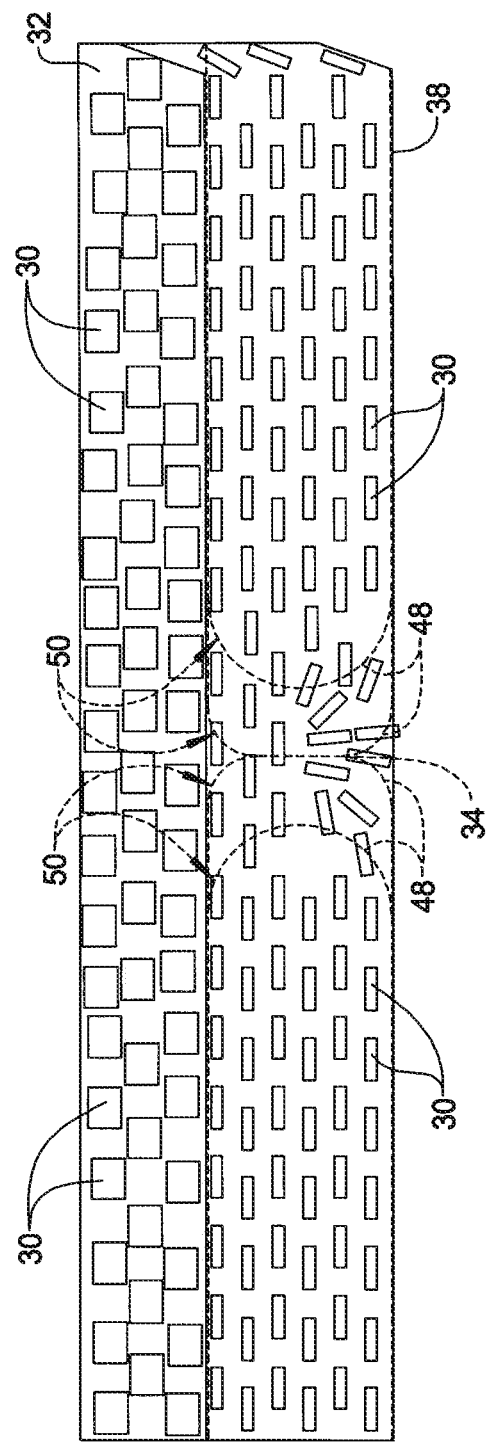

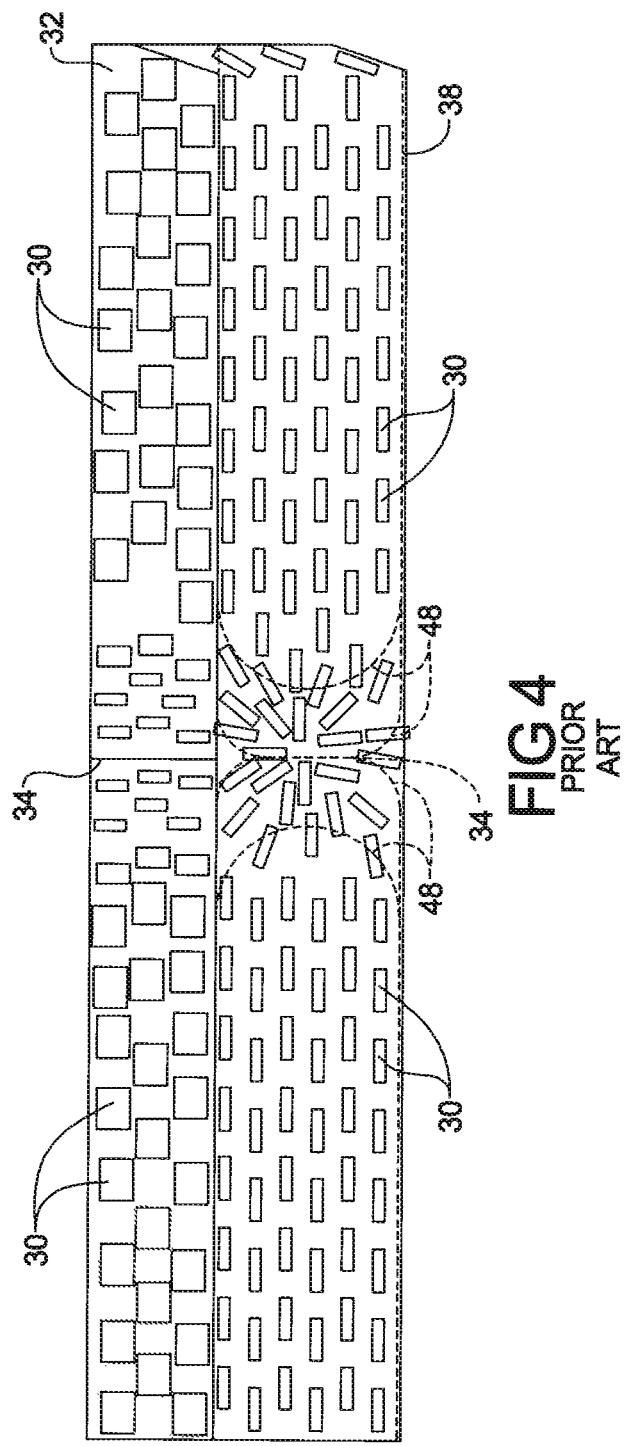

METALLIC RESIN MOLDING OF ANNULAR COMPONENTS WITHOUT VISIBLE KNIT LINE

FIELD

The present disclosure relates to orienting metallic resin flakes at an outer surface of a knit line of an annular or ring-shaped component.

BACKGROUND

Molding of annular components involves two streams of resin flowing along opposite sides of the annular mold cavity, with the front faces of the two streams coming together and forming a weld or knit line that is visible at the surface. It is known to provide an outboard gate adjacent the knit line leading to an outboard overflow cavity to try and improve the knit line. Nevertheless, the inclusion of fibrous material in the resin is known to result in significantly weaker knit lines due to improper orientation of the fibers at the knit line.

Automotive vehicles include a large number of annular components, including bezels commonly found on instrument panels, door trims, floor consoles, tail lamps, badging, etc. The surface of these components that is visible must meet Class A standards, which includes not having a visible knit line. When a Class A surface with metallic flake appearance is desired, the part must be first molded and then separately painted to provide the metal flake appearance. Despite the manufacturing inefficiency and additional costs of such separate molding and painting operations, none of the automotive manufacturers, the molding suppliers, or the metallic resin suppliers have been able to find a way to mold annular components with a metallic resin without a visible knit line at the Class A surface that eliminates the need to separately paint the Class A surface.

SUMMARY

In accordance with an aspect of the present disclosure, a method of orienting metallic resin flakes at a Class A surface of a knit line of an annular component includes heating a core mold component defining a lower surface of the injection mold set corresponding to the lower surface of the annular component to a base temperature. A cavity mold component defining the upper surface of the injection mold set corresponding to the Class A surface of the annular component is heated to a higher temperature than the base temperature. Faces of two streams of metallic resin, including the metallic resin flakes, injected into the mold set are caused to come together at the knit line. Metallic resin flakes are caused to flow into an inboard overflow cavity through an inboard gate positioned adjacent the knit line. Metallic resin flakes are caused to flow into an outboard overflow cavity through an outboard gate positioned adjacent the knit line.

In accordance with an aspect of the present disclosure, the injection of metallic resin into the mold cavity causing the metallic resin flakes to flow into the inboard overflow cavity and into the outboard overflow cavity includes causing unoriented flakes to be replaced by oriented flakes at the Class A surface of the knit line.

In accordance with an aspect of the present disclosure, the faces of the two streams include a surface skin at a lower temperature than the higher temperature. In addition, the injection of metallic resin into the mold cavity causing faces of two streams of metallic resin to come together includes causing an upper portion of the surface skin to contact the cavity mold component at the higher temperature and re-melt at the knit line.

In accordance with an aspect of the present disclosure, the faces of the two streams include a surface skin at a lower temperature than the higher temperature. In addition, the higher temperature is sufficient to re-melt a portion of the surface skin contacting the cavity mold component at the knit line.

In accordance with additional aspects of the present disclosure, the higher temperature is between about 175 degrees Fahrenheit and about 300 degrees Fahrenheit. In addition, the base temperature is between about 100 degrees Fahrenheit and about 150 degrees Fahrenheit.

DRAWINGS

The present invention will become more fully understood from the detailed description and the accompanying drawings.

FIG. 2 is a cross-sectional view taken along line 2-2 of FIG. 1 during the molding process and additionally including the upper cavity mold component.

FIG. 3 is a partial combined cross-sectional and perspective view showing the final orientation of the metallic flakes within and at the Class A surface of the component and the resin stream faces coming together using the exemplary process of the present disclosure.

FIG. 4 is a partial combined cross-sectional and perspective view similar to FIG. 3, showing the final orientation of the metallic flakes within and at the Class A surface of the component and the resin stream faces coming together using a prior art process.

DETAILED DESCRIPTION

Figure 1:
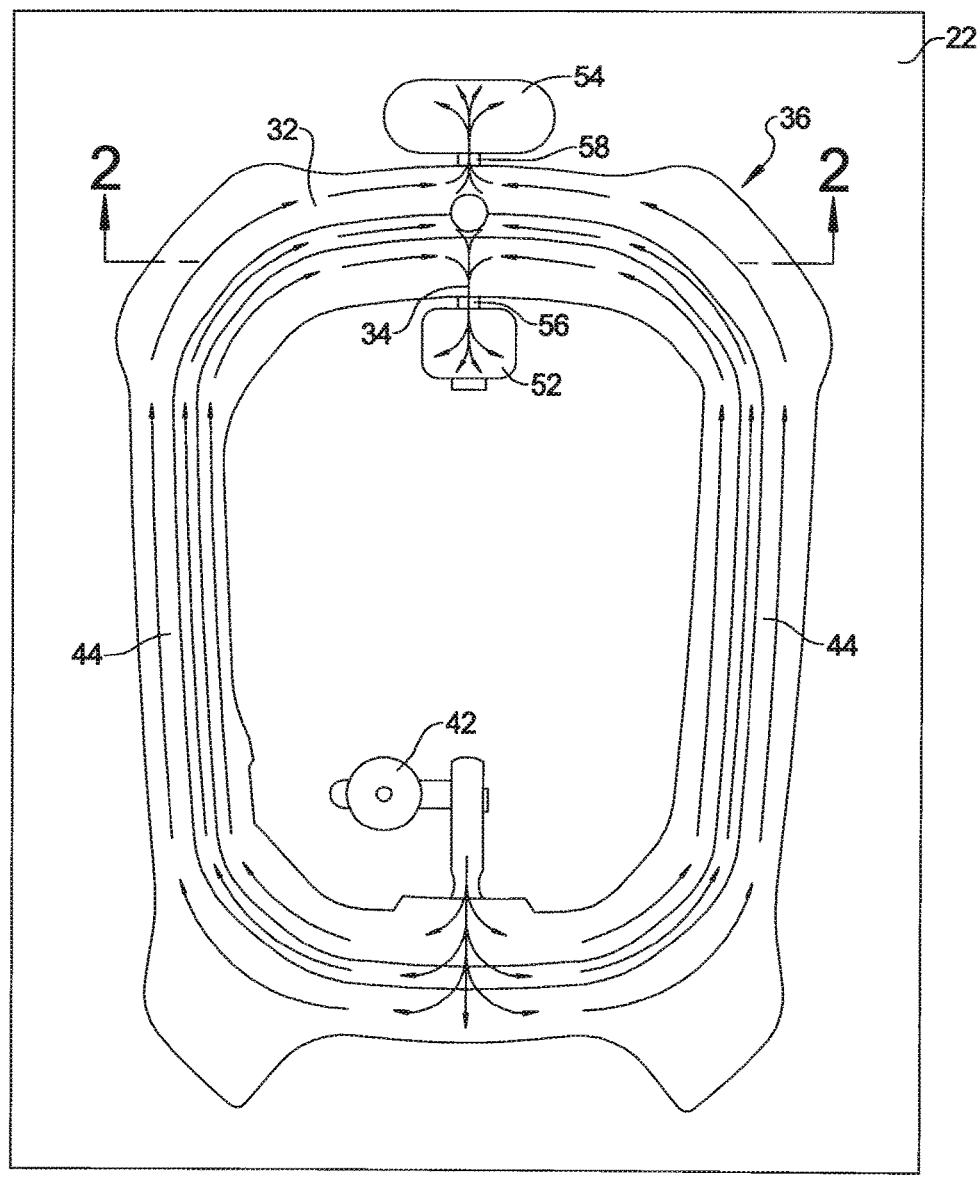
FIG. 1 is a top plan view of an example annular component in a lower core mold component useful in an exemplary process of orienting metallic resin flakes at an outer surface of a knit line of an annular or ring-shaped component in accordance with the present disclosure.

Further areas of applicability will become apparent from the description, claims and drawings, wherein like reference numerals refer to like features throughout the several views of the drawings. It should be understood that the detailed description, including disclosed embodiments and drawings referenced therein are merely exemplary in nature, intended for purposes of illustration only, and are not intended to limit the scope of the present disclosure.

An example embodiment of a method orienting metallic resin flakes 30 at an outer Class A surface 32 of a knit line 34 of an annular or ring-shaped component 36 in accordance with the present disclosure is described with reference to FIGS. 1-3. The example method uses a mold set 20 having a lower core mold component 22, and an upper cavity mold component 24. The upper cavity mold component 24 defines an upper surface 26 of the injection mold set 20 corresponding to the decorative Class A surface 32 of the annular component 36. The lower core mold component 22 defines a lower surface 28 of the injection mold set 20 corresponding to the lower (B side) surface 38 of the annular component 36. Thus, the mold set 20 defines a cavity 40 corresponding to the overall shape of the annular component 36.

The core mold component 22 is heated to a base temperature, which is typically in the range of from about 100 degrees Fahrenheit (38 degrees Celsius) to about 150 degrees Fahrenheit (65 degrees Celsius); for example, about 120 degrees Fahrenheit (50 degrees Celsius). The cavity mold component 24 is heated to a higher temperature, which is typically in the range of from about 175 degrees Fahrenheit (78 degrees Celsius) to about 300 degrees Fahrenheit (150 degrees Celsius); for example, about 230 degrees Fahrenheit (110 degrees Celsius). It should be understood that in some cases, higher or lower temperatures than those noted above may alternatively be used to accommodate different metallic resin materials.

The metallic resin is injected into the mold cavity 40 through an injection port 42. As indicated by the metallic resin flow arrows 44, the metallic resin splits into two streams 46 within the mold cavity 40; with each metallic resin stream flowing down one of the two sides or arms of the annular component 36 and toward each other within the cavity 40. The distal end of each stream 46 begins to cool, forming an outer face 48 (comprising a slightly hardened or less viscous resin skin) extending between the upper mold surface 26 and the lower mold surface 28. This skin or face 48 has a shape generally corresponding to a partial spherical or outwardly bowed (convex) arcuate shape.

As can be understood with reference to FIG. 4, in prior processes the metallic flakes 30 tend to align with the outer face 48 such that they tend to rotate toward the center. The faces 48 of the streams 46 move toward each other and contact each other to form the knit line 34. As the faces 48 contact and push against each other, their spherical or outwardly bowed shapes are pushed into a more flattened shape. As can also be understood with reference to FIG. 4, this tends to further rotate the metallic flakes 30 adjacent the faces 48 even more toward the center such that side edges of these unoriented metallic flakes 30 are visible at the Class A surface 32 of the resin, rather than their reflective sides like the oriented metallic resin flakes 30 adjacent the Class A surface 32 away from the faces 48. This results in a visible knit line 34 at the Class A surface.

Returning to FIGS. 1-3, the temperature of the resin of this face or outer surface skin 48 is typically lower than the higher temperature of the upper cavity mold component 24 and has hardened slightly. As can be understood from FIG. 3, as the faces 48 become flattened an upper portion 50 of the faces or skins 48 contact the cavity mold component 24 at its higher temperature, which re-melts these upper portions 50 of the faces or skins 48 at the knit line 34. In the preferred embodiment, the upper mold surface 26 is heated uniformly throughout to provide a uniform gloss to the Class A surface 32. Alternatively, the cavity mold component 24 and the upper mold surface 26 is locally heated to the higher temperature adjacent the knit line 34.

The mold set 20 includes an inboard overflow cavity 52 and an out-board overflow cavity 54 connected to the annular component cavity 40 through an inboard and an out-board gate or passage, 56 and 58, respectively, positioned adjacent respective inboard and outboard sides of the knit line 34.

Sufficient metallic resin is injected into the mold cavity to cause the unoriented flakes 30 in the resin adjacent the upper mold surface 26 corresponding to the Class A surface 32, including that within any re-melted resin of the upper portion 50 of the face skin 48, to move toward and into the inboard and out-board overflow cavities 52 and 54, respectively. This allows the oriented metallic flakes 30 adjacent the upper mold surface 26 and initially positioned away from the knit line 34 to flow toward the knit line 34 and to replace the unoriented flakes flowing away from the upper mold surface 26 at the knit line 34 and into the overflow cavities 52 and 54.

As can be understood from FIG. 3, the knit line 34 typically remains, but is camouflaged by the oriented metallic resin flakes 30 adjacent the Class A surface 32 at the knit line 34. Thus, the knit line 34 is not visible at the Class A surface as it is with prior processes. Because the temperature of the upper cavity mold component 24 is higher than that of the lower core mold component 22, the metallic resin is more melted and less viscous adjacent the upper cavity mold component 24 becoming more hardened and viscous toward the lower core mold component 22. As a result, the metallic resin adjacent the upper cavity mold component 24, or adjacent the upper mold surface 26 corresponding to the Class A surface 32, preferentially flows into the overflow cavities 52 and 54.

Differentiation terms, such as "upper" and "lower" are used herein to differentiate between pairs of components, but such terms are not intended to exclude alternative component orientations of the Class A and B side components surfaces of the corresponding mold surfaces corresponding to, or defining, these component surfaces.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of orienting metallic resin flakes at a Class A surface of a knit line of an annular component comprising:
    heating a core mold component defining a lower surface of an injection mold set corresponding to a lower surface of the annular component to a base temperature;
    heating a cavity mold component defining an upper surface of the injection mold set corresponding to the Class A surface of the annular component to a higher temperature than the base temperature;
    causing faces of two streams of metallic resin, including the metallic resin flakes, injected into the injection mold set to come together at the knit line;
    causing metallic resin flakes to flow into an inboard overflow cavity through an inboard gate positioned adjacent the knit line;
    causing metallic resin flakes to flow into an outboard overflow cavity through an outboard gate positioned adjacent the knit line;
    wherein the causing metallic resin flakes to flow into the inboard overflow cavity and into the outboard overflow cavity comprises causing unoriented flakes to be replaced by oriented flakes at the Class A surface of the knit line;
    wherein the higher temperature is between about 175 degrees Fahrenheit and about 300 degrees Fahrenheit.

2. The method of orienting metallic resin flakes at a Class A surface of a knit line of an annular component of claim 1, wherein the faces of the two streams comprise a surface skin at a lower temperature than the higher temperature and wherein the causing faces of two streams of metallic resin to come together comprises causing an upper portion of the surface skin to contact the cavity mold component at the higher temperature and re-melt at the knit line.

3. The method of orienting metallic resin flakes at a Class A surface of a knit line of an annular component of claim 1, wherein the faces of the two streams comprise a surface skin at a lower temperature than the higher temperature and wherein the higher temperature is sufficient to re-melt a portion of the surface skin contacting the cavity mold component at the knit line.

4. The method of orienting metallic resin flakes at a Class A surface of a knit line of an annular component of claim 1, wherein the base temperature is between about 100 degrees Fahrenheit and about 150 degrees Fahrenheit.

\* \* \* \* \*